United States Patent
Lv et al.

(10) Patent No.: US 10,699,670 B2
(45) Date of Patent: Jun. 30, 2020

(54) METHOD AND APPARATUS FOR ADJUSTING COLOR TEMPERATURE OF DISPLAY DEVICE

(71) Applicants: BOE TECHNOLOGY GROUP CO., LTD., Beijing (CN); HEFEI BOE DISPLAY LIGHTING CO., LTD., Hefei, Anhui (CN)

(72) Inventors: Tu Lv, Beijing (CN); Peina Wang, Beijing (CN)

(73) Assignees: BOE TECHNOLOGY GROUP CO., LTD., Beijing (CN); HEFEI BOE DISPLAY LIGHTING CO. LTD., Hefei, Anhui (CN)

( * ) Notice: Subject to any disclaimer, the term of this patent is extended or adjusted under 35 U.S.C. 154(b) by 5 days.

(21) Appl. No.: 16/116,379

(22) Filed: Aug. 29, 2018

(65) Prior Publication Data
US 2019/0304398 A1 Oct. 3, 2019

(30) Foreign Application Priority Data
Mar. 30, 2018 (CN) .......................... 2018 1 0297713

(51) Int. Cl.
*G09G 5/02* (2006.01)
*G06F 3/14* (2006.01)

(52) U.S. Cl.
CPC ............... *G09G 5/02* (2013.01); *G06F 3/14* (2013.01); *G09G 2320/0666* (2013.01)

(58) Field of Classification Search
CPC .. G09G 5/02; G09G 2320/0666; G09G 5/026; G09G 3/2003; G09G 2360/144; G09G 2320/0242; G09G 3/36; G06F 3/14
See application file for complete search history.

(56) References Cited

U.S. PATENT DOCUMENTS 8,721,427 B2 * 5/2014 Kelly ................... G07F 17/3211
463/20
9,654,754 B2 * 5/2017 Iwafuchi ................. H04N 9/68
(Continued)

FOREIGN PATENT DOCUMENTS

CN 201465470 U 5/2010
CN 102682738 A 9/2012
(Continued)

OTHER PUBLICATIONS

First Chinese Office Action dated Mar. 19, 2020, received for corresponding Chinese Application Na 201810297713.7, 13 pages.

*Primary Examiner* — Grant Sitta
(74) *Attorney, Agent, or Firm* — Kinney & Lange, P.A.

(57) ABSTRACT

The embodiments of the present application provide a method and apparatus for adjusting color temperature of a display device. The method for adjusting color temperature includes establishing an initial set of color temperature relationship, wherein an element in the initial set of color temperature relationship at least comprises three components including a condition level value of a user, a color temperature value of the display device, and a fitness value of the user; determining an optimized set of color temperature relationship from the initial set of color temperature relationship, wherein a fitness value component of each element in the optimized set of color temperature relationship is within a first threshold range; detecting a condition level value of a current user; determining, from the optimized set of color temperature relationship, an element corresponding to the condition level value of the current user according to the detected condition level value of the current user; and adjusting the color temperature of the display device according to a color temperature value of the determined element.

18 Claims, 4 Drawing Sheets

(56) References Cited

U.S. PATENT DOCUMENTS

| | | | |
|---|---|---|---|
| 10,568,178 B2* | 2/2020 | Lv | H05B 45/20 |
| 2004/0008208 A1* | 1/2004 | Dresevic | G06F 1/1607 |
| | | | 345/589 |
| 2007/0285433 A1* | 12/2007 | Wu | G09G 5/02 |
| | | | 345/589 |
| 2008/0111819 A1* | 5/2008 | Sung | G06F 3/013 |
| | | | 345/467 |
| 2009/0201309 A1* | 8/2009 | Demos | G01J 3/02 |
| | | | 345/589 |
| 2011/0115811 A1* | 5/2011 | Zhang | G09G 5/02 |
| | | | 345/590 |
| 2012/0182276 A1* | 7/2012 | Kee | G09G 5/10 |
| | | | 345/207 |
| 2013/0257573 A1* | 10/2013 | Takahashi | B82Y 30/00 |
| | | | 335/302 |
| 2013/0274007 A1* | 10/2013 | Hilbert | A63F 13/00 |
| | | | 463/29 |
| 2014/0028545 A1* | 1/2014 | Tsai | G06F 3/005 |
| | | | 345/156 |
| 2014/0285431 A1* | 9/2014 | Yeom | G09G 5/00 |
| | | | 345/156 |
| 2016/0109942 A1* | 4/2016 | Lyons | G06K 9/00 |
| | | | 345/156 |
| 2016/0232408 A1* | 8/2016 | Lee | G06K 9/00617 |
| 2019/0266977 A1* | 8/2019 | Ward | G09G 3/3208 |
| 2019/0304398 A1 | 10/2019 | Lv et al. | |

FOREIGN PATENT DOCUMENTS

| | | |
|---|---|---|
| CN | 105869580 A | 8/2016 |
| CN | 106909334 A | 6/2017 |
| CN | 106951164 A | 7/2017 |
| CN | 107045416 A | 8/2017 |
| CN | 107505836 A | 12/2017 |
| WO | 2017215142 A1 | 12/2017 |

* cited by examiner

METHOD AND APPARATUS FOR ADJUSTING COLOR TEMPERATURE OF DISPLAY DEVICE

CROSS-REFERENCE TO RELATED APPLICATION

This application claims priority to the Chinese Patent Application No. 201810297713.7, filed on Mar. 30, 2018, which is incorporated herein by reference in its entirety.

BACKGROUND

The present application relates generally to the field of display technology, but is not limited thereto. More particularly, the present application concerns to a method and apparatus for adjusting color temperature of a display device.

With the development of display technology, display devices have been widely used in people's daily life. In order to improve users' comfort in the use of the display devices, in addition to brightness, color temperature is also an important general index. However, the method for adjusting color temperature in the related art generally has poor adjustment accuracy and high computation complexity, and is not targeted.

SUMMARY

The embodiments of the present disclosure provide a method for adjusting color temperature of a display device. The method for adjusting color temperature comprises: establishing an initial set of color temperature relationship, wherein an element in the initial set of color temperature relationship at least comprises three components including a condition level value of a user, a color temperature value of the display device, and a fitness value of the user; determining an optimized set of color temperature relationship from the initial set of color temperature relationship, wherein a fitness value component of each element in the optimized set of color temperature relationship is within a first threshold range; detecting a condition level value of a current user; determining, from the optimized set of color temperature relationship, an element corresponding to the condition level value of the current user according to the detected condition level value of the current user; and adjusting the color temperature of the display device according to a color temperature value of the determined element.

In an embodiment, the element in the initial set of color temperature relationship further comprises at least one additional component indicating at least one classification index of the user, wherein determining, from the optimized set of color temperature relationship, an element corresponding to the condition level value of the current user according to the detected condition level value of the current user comprises: obtaining a value of at least one classification index of the current user; and determining, according to the obtained value of the at least one classification index of the current user and the detected condition level value of the current user, the element corresponding to the condition level value of the current user from the optimized set of color temperature relationship.

In an embodiment, determining an optimized set of color temperature relationship from the initial set of color temperature relationship comprises: selecting elements having a fitness value within the first threshold range from the initial set of color temperature relationship as a first subset, and selecting elements having a fitness value not within the first threshold range from the initial set of color temperature relationship as a second subset; performing a genetic operation on the second subset, and selecting elements having a fitness value within the first threshold range from the elements generated by performing the genetic operation as a third subset; and adding the first subset and the third subset to the optimized set of color temperature relationship.

In an embodiment, performing a genetic operation on the second subset, and selecting elements having a fitness value within the first threshold range from the elements generated by performing the genetic operation as a third subset comprises: performing at least one of a selection operation, an interlace operation, and a mutation operation on the elements in the second subset.

In an embodiment, performing at least one of a selection operation, an interlace operation, and a mutation operation on the elements in the second subset comprises: selecting elements having a fitness value within a second threshold range from the second subset, and performing the interlace operation or the mutation operation on the selected elements and unselected elements respectively.

In an embodiment, performing at least one of a selection operation, an interlace operation, and a mutation operation on the elements in the second subset further comprises: adding, to the third subset, elements having a fitness value within the first threshold range among elements generated by performing the interlace operation or the mutation operation on the selected elements and the unselected elements respectively, and adding, to a fourth subset, elements having a fitness value not within the first threshold range among the elements generated by performing the interlace operation or the mutation operation on the selected elements and the unselected elements respectively; and performing at least one of the selection operation, the interlace operation, and the mutation operation on the fourth subset according to a fitness value of each element in the fourth subset until fitness values of resulted elements are all in within the first threshold range.

In an embodiment, the condition level value indicates a condition of a body of the user or a part of the body of the user, and the fitness value indicates a degree of fitness of the user having a corresponding condition level at a corresponding color temperature value.

The embodiments of the present disclosure further provide an apparatus for adjusting color temperature of a display device, comprising: a user condition detector configured to detect a condition level value of a current user; a processor configured to perform operations of: establishing an initial set of color temperature relationship, wherein an element in the initial set of color temperature relationship at least comprises three components including a condition level value of a user, a color temperature value of the display device, and a fitness value of the user; determining an optimized set of color temperature relationship from the initial set of color temperature relationship, wherein a fitness value component of each element in the optimized set of color temperature relationship is within a first threshold range; determining, from the optimized set of color temperature relationship, an element corresponding to the condition level value of the current user according to the condition level value of the current user detected by the user condition detector; and adjusting the color temperature of the display device according to a color temperature value of the determined element.

In an embodiment, the element in the initial set of color temperature relationship further comprises at least one additional component indicating at least one classification index of the user, and the processor is further configured to: obtain a value of at least one classification index of the current user; and determine, according to the obtained value of the at least one classification index of the current user and the detected condition level value of the current user, the element corresponding to the condition level value of the current user from the optimized set of color temperature relationship.

In an embodiment, the processor is further configured to: select elements having a fitness value within the first threshold range from the initial set of color temperature relationship as a first subset, and select elements having a fitness value not within the first threshold range from the initial set of color temperature relationship as a second subset; perform a genetic operation on the second subset, and select elements having a fitness value within the first threshold range from the elements generated by performing the genetic operation as a third subset; and add the first subset and the third subset to the optimized set of color temperature relationship.

In an embodiment, the processor is further configured to: perform at least one of a selection operation, an interlace operation, and a mutation operation on the elements in the second subset.

In an embodiment, the processor is further configured to: select elements having a fitness value within a second threshold range from the second subset, and perform the interlace operation or the mutation operation on the selected elements and unselected elements respectively.

In an embodiment, the processor is further configured to: add, to the third subset, elements having a fitness value within the first threshold range among elements generated by performing the interlace operation or the mutation operation on the selected elements and the unselected elements respectively, and add, to a fourth subset, elements having a fitness value not within the first threshold range among the elements generated by performing the interlace operation or the mutation operation on the selected elements and the unselected elements respectively; and perform at least one of the selection operation, the interlace operation, and the mutation operation on the fourth subset according to a fitness value of each element in the fourth subset until fitness values of resulted elements are all in within the first threshold range.

In an embodiment, the condition level value indicates a condition of a body of the user or a part of the body of the user, and the fitness value indicates a degree of fitness of the user at a corresponding color temperature value.

The embodiments of the present disclosure further provide a computer device comprising a memory, a user condition detector and a processor, wherein the memory is configured to store instructions executable by the processor, which, when executed by the processor, enable the computer device to perform the method for adjusting color temperature according to any of the embodiments described above.

The embodiments of the present disclosure further provide a computer readable storage medium storing instructions which, when executed by a computer, implement the method for adjusting color temperature according to any of the embodiments described above.

BRIEF DESCRIPTION OF THE DRAWINGS

The accompanying drawings are used to provide a further understanding of the technical solutions of the present disclosure, and constitute a part of the specification. The accompanying drawings are used to explain the technical solutions of the present disclosure together with the embodiments of the present application, and do not constitute a limitation of the technical solutions of the present disclosure.

DETAILED DESCRIPTION

In order to make the purposes, technical solutions and advantages of the present disclosure more clear and apparent, the embodiments of the present disclosure will be described in detail below with reference to the accompanying drawings. It should be understood that the embodiments of the present application and features in the embodiments can be combined with each other in any permutation without a conflict.

The following specific embodiments according to the present disclosure can be combined with each other, and the same or similar concepts or processes may not be described in detail in some embodiments.

At present, most display devices on the market are controlled by brightness adjustment, which brings a comfortable perception effect to users to view a display screen; however, brightness adjustment has limitations on protection and comfort degrees of human eyes. Color temperature is a scale of a light color of a light source, and is the most general index representing spectral quality of the light source. Many studies have shown that the color temperature may influence people's emotions, and it will be popular to apply the color temperature to a display illumination system.

Studies have shown that color temperature has a major impact on human psychology. The higher the color temperature, the colder the light, and the lower the color temperature, the warmer the light. If the color temperature is below 3300 Kelvin (K for short), the light is mostly red light, which is warm light, and is usually used in environments with low visibility such as indoors etc.; if the color temperature is between 3300K and 5000K, the light is warm white light, with three colors which are Red, Green and Blue (RGB for short) having equal ratios, and is mostly used in environments such as shops, waiting halls, etc.; and if the color temperature is greater than 5000K, the light is cool color light, which is mostly blue light, and is mostly used in environments with high visibility such as outdoors, conference rooms etc.

There is generally a problem in the related art that the method for adjusting color temperature has poor adjustment accuracy and high computation complexity and it is not easy to implement the method for adjusting color temperature.

Figure 1:
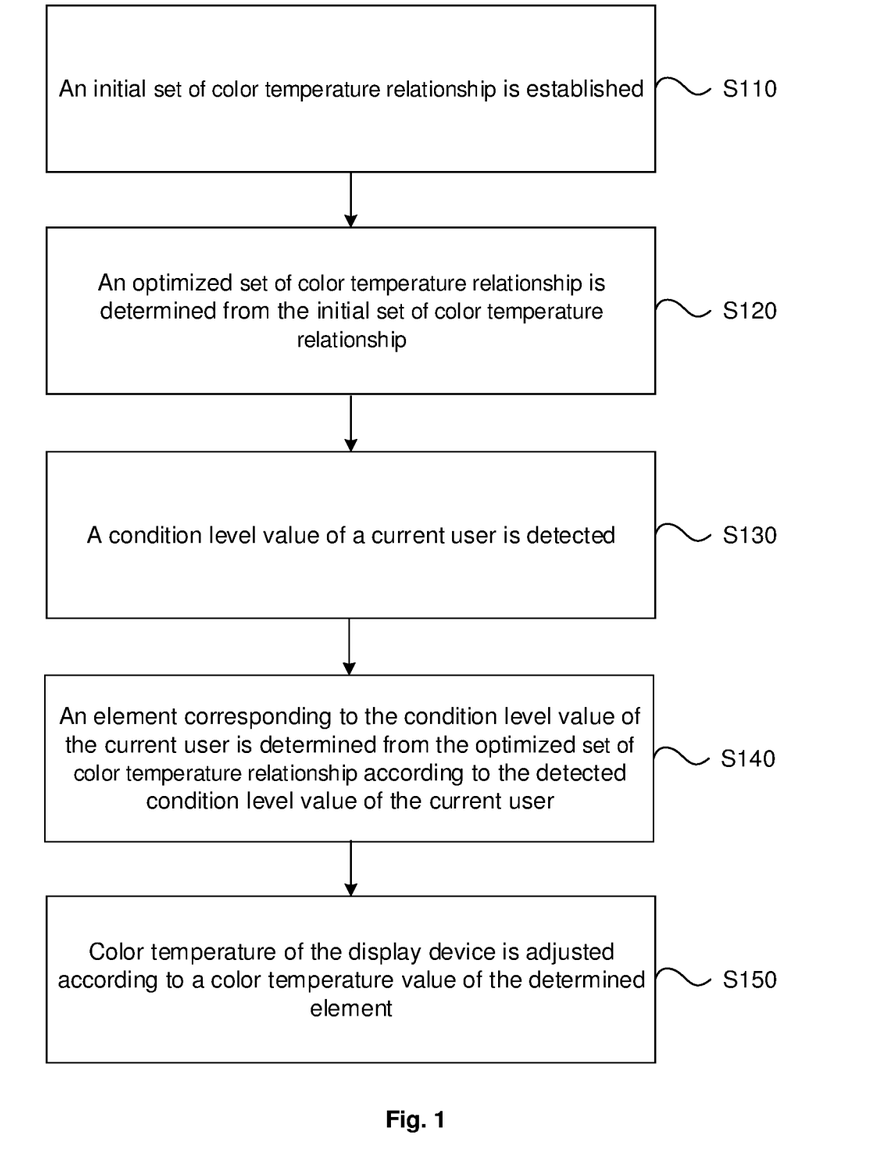
FIG. 1 is a flowchart of a method for adjusting color temperature according to an embodiment of the present disclosure.

FIG. 1 is a flowchart of a method for adjusting color temperature according to an embodiment of the present disclosure. The method for adjusting color temperature according to the embodiment of the present disclosure may comprise the following steps.

In S110, an initial set of color temperature relationship is established, wherein an element in the initial set of color temperature relationship at least comprises three components including a condition level value of a user, a color temperature value of a display device, and a fitness value of the user.

In the embodiment of the present disclosure, the initial set of color temperature relationship comprises a plurality of elements, each of which comprises a plurality of components including a condition level value of a user, a color temperature value of a display device, and a fitness value of the user. In an embodiment, the condition level value indicates a condition of a body of the user or a part (such as eyes) of the body, and the fitness value indicates a degree of fitness of the user having a corresponding condition level at a corresponding color temperature value. It can be seen that in the embodiment of the present disclosure, the fitness value of the element in the color temperature relationship set indicates a matching relationship between the condition level value and the color temperature value in the same element, which is measured by subjective feeling of the user or passive measurement.

In practical applications, fitness values may be obtained by, for example, pairing multiple condition level values of a user with multiple color temperature values by traversing all possible combinations, each of which corresponds to one element. Subsequently, all elements are simulated to obtain fitness values for these elements as fitness value components of the corresponding elements. For example, the fitness values of the elements may be divided into four levels, including first, second, third, and fourth levels (in a descending order of fitness degrees), and condition level values of the elements may be divided into three levels, including S level (corresponding to a comfort state), M level (corresponding to a tired state) and L level (corresponding to a very tired state), and the color temperature values of the elements may be divided into 6 levels, including reddish warm color light (RB), normal warm light (RM), normal natural white light (RS), slightly blue natural white light (BS), normal cool color light (BM), and bluish cool color light (BL). In a simulation process, in environments with different color temperature values, a user' eyes may have different experiences, and when the user's eyes are in the above different states, the user' eyes also have different experiences on the color temperature values. Therefore, all the combinations (each corresponding to one element) shown in Table 1 are practically simulated to obtain fitness values thereof. The simulation process may be, for example, a simulation process performed by a computer program. As shown in Table 1, illustrated is an example of fitness values corresponding to the different combinations (elements) described above.

TABLE 1

| Color temperature value | Condition level value | | |
|---|---|---|---|
| | S level | M level | L level |
| RB | Second level | First level | First level |
| RM | Second level | First level | First level |
| RS | First level | Second level | Second level |
| BS | First level | Third level | Third level |
| BM | First level | Third level | Fourth level |
| BL | Second level | Fourth level | Fourth level |

It should be understood that the condition level values shown in Table 1 above are only illustrative, and neither mean that a correspondence relationship between the condition level values and the color temperature values can be reflected only in the above manner, nor represent that a fitness value of an element comprises only a few cases exemplified in Table 1.

In some embodiments, the elements in the initial set of color temperature relationship further comprises at least one additional component indicating at least one classification index of the user. For example, eyes of different crowds and different users have different degrees of fitness to a color temperature value. For example, crowds with different ages or crowds with different eye sights generally have different degrees of fitness to the same color temperature value. In addition, different users also have different degrees of fitness to the same color temperature value. Therefore, a classification index indicating an age of the user may be added to adjust the color temperature in a more targeted manner using the technical solution according to the present disclosure, and achieve a more effective adjustment effect.

In S120, an optimized set of color temperature relationship is determined from the initial set of color temperature relationship, wherein a fitness value component of each element in the optimized set of color temperature relationship is within a first threshold range.

In the embodiment of the present disclosure, after the initial set of color temperature relationship is established, a preferable or preferred subset, that is, an optimized set of color temperature relationship, may be determined from the initial set of color temperature relationship according to the fitness value. This may be achieved by limiting the fitness value using the first threshold range, i.e., verifying whether the fitness value of the element in the initial set of color temperature relationship meets specific threshold requirements, for example, determining whether the fitness value is within the first threshold range, and determining elements which meet the threshold requirements to be the optimized set of color temperature relationship.

In some embodiments, elements which do not meet the threshold requirements may further be optimized, and if the optimized elements meet the threshold requirements, the optimized elements are added to the optimized set of color temperature relationship. It can be understood that elements in the initial set of color temperature relationship which are within the first threshold range may be directly retained in the optimized set of color temperature relationship, and elements in the initial set of color temperature relationship which are not within the first threshold range are replaced by new elements, so that each element in the optimized set of color temperature relationship is within the first threshold range.

For example, in an element, a condition level value is at level 1, and a color temperature value is x. In a case that the first threshold range is at a first level or a second level (corresponding to higher fitness requirements), if a fitness value of the element is at a first level or a second level, the fitness value is within the first threshold range, and the element will be added to the optimized set. If the fitness value of the element is at a third level or a fourth level, the fitness value is not within the first threshold and will not be added to the optimized set.

In S130, a condition level value of a current user is detected.

On the basis of steps S110 and S120, the condition level value of the current user may be detected, and the detected condition level value may be used in a subsequent step to determine a target color temperature value to which a current color temperature value is to be adjusted according to the determined optimized set of color temperature relationship.

It should be understood that a serial order of the steps in the method according to the present disclosure does not limit an execution order of the steps. For example, S130 may be performed in advance or concurrently with S110 or S120, which is not limited in the present disclosure.

In S140, an element corresponding to the condition level value of the current user is determined from the optimized set of color temperature relationship according to the detected condition level value of the current user. In S150, color temperature of the display device is adjusted according to a color temperature value of the determined element.

In the embodiment of the present disclosure, the optimized set of color temperature relationship is obtained by optimizing the initial set of color temperature relationship, and the fitness value of each element in the optimized set of color temperature relationship is within the first threshold range, that is, the optimized correspondence relationship between the condition level values and the color temperature values is a set which meet user requirements or system settings. Therefore, when a terminal device is used by a user, the terminal device may know a specific user or a crowd to which the user is assigned. The terminal device may obtain a condition level value of the current user by shooting the user through a webcam of the terminal device, match the obtained condition level value of the current user with condition level values of a user in various elements in the optimized set of color temperature relationship according to the condition level value of the current user to find an element which has the same condition level value as that of the current user or has a similar condition level value to that of the current user, and determine a color temperature value of the element to be a target value to which current color temperature is to be adjusted, thereby performing color temperature adjustment based on the above determined color temperature value.

For example, the terminal device detects eyes of the current user through a user condition detector (for example, a camera, a webcam etc.) For example, a blinking frequency of the current user may be obtained by shooting through the camera in consecutive frames, wherein different blinking frequencies correspond to different condition level values. As another example, the terminal device may also monitor an eye closing ratio of the current user through the webcam, and detect the condition level value of the current user according to the eye closing ratio. For example, condition level values may be divided into three levels, corresponding to an awake state, a tired state, and a very tired state respectively. When the eye closing ratio is less than 0.075, it corresponds to an awake state at this time, and the condition level value is at a first condition level, when the eye closing ratio is between 0.075 and 0.15, it corresponds to a tired state at this time, and the condition level value is a second condition level, and when the eye closing ratio is greater than 0.15, it corresponds to a very tired state at this time, and the condition level value is a third condition level.

In a case that the element in the initial set of color temperature relationship further comprises at least one additional component indicating at least one classification index of the user, step S140 further comprises: obtaining a value of at least one classification index of the current user; and determining, according to the obtained value of the at least one classification index of the current user and the detected condition level value of the current user, the element corresponding to the condition level value of the current user from the optimized set of color temperature relationship.

That is, in a case that the elements are enriched by taking the classification index into account, selection of a target element from the elements is more refined, and the solution for determining a color temperature value in such a way is more targeted.

In a method for adjusting color temperature in the related art, there is a common phenomenon that it is not easy to establish an equation for calculating a color temperature value and there is only a single adjustment manner, and thus there is a problem that the adjustment accuracy and the real-time performance are poor. In addition, the method in the related art does not take individual differences among persons into account, thereby resulting in that there are different requirements for condition levels and the adjustment manner is not sufficiently humanized.

The method for adjusting color temperature according to the embodiments of the present disclosure finds preferable or preferred color temperature values based on the condition level values of different crowds or different users, and associates the color temperature values with specific crowds or specific users, so as to find a color temperature value suitable for each user based on individual differences among the users, which solves the problem that the comfort of the human eyes is influenced due to the long-term use of single color temperature, and provides a personalized manner of intelligently adjusting the color temperature.

The method for adjusting color temperature according to the embodiments of the present disclosure optimizes the established initial set of color temperature relationship by using the fitness value of each element in the initial set of color temperature relationship to generate an optimized set of color temperature relationship in which each element meets a preset condition. In this way, when a condition level value of the current user is detected, a color temperature value corresponding to the detected condition level value of the current user is determined according to a correspondence relationship between the condition level values and the color temperature values of various elements in the optimized set of color temperature relationship, so as to adjust the color temperature. The method for adjusting color temperature according to the embodiments of the present disclosure finds color temperature values suitable for different crowds or specific users by taking individual differences among different crowds or different users into account, thereby improving the intelligence and humanization of the color temperature adjustment.

Figure 2:
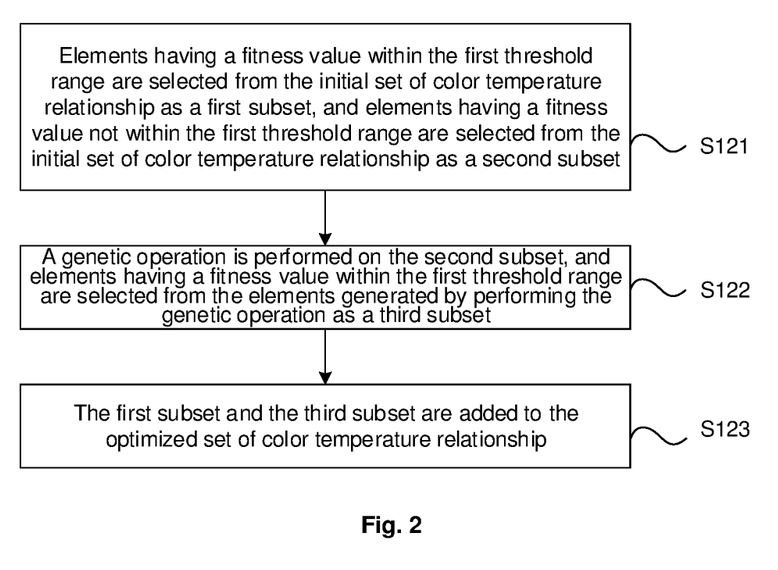
FIG. 2 is a flowchart of another method for adjusting color temperature according to an embodiment of the present disclosure.

In an embodiment, FIG. 2 is a flowchart of another method for adjusting color temperature according to an embodiment of the present disclosure. On the basis of the embodiment shown in FIG. 1, in the method according to the embodiment of the present disclosure, an implementation of S120 may comprise the following steps.

In S121, elements having a fitness value within the first threshold range are selected from the initial set of color temperature relationship as a first subset, and elements having a fitness value not within the first threshold range are selected from the initial set of color temperature relationship as a second subset.

In S122, a genetic operation is performed on the second subset, and elements having a fitness value within the first threshold range are selected from the elements generated by performing the genetic operation as a third subset.

In S123, the first subset and the third subset are added to the optimized set of color temperature relationship.

In the embodiment of the present disclosure, as some elements in the initial set of color temperature relationship may have higher fitness values, the elements themselves have met the first threshold requirements, that is, the elements need not to be optimized. Only elements in the initial set of color temperature relationship which are not within the first threshold range are optimized. Therefore, the elements having a higher fitness value within the first threshold range are selected as the first subset, and remaining elements having a fitness value not within the first threshold range are taken as the second subset. The elements in the first subset may all be used as elements in the optimized set of color temperature relationship. Then, the second subset may be specifically optimized using, for example, a genetic algorithm, that is, a genetic operation is performed on the second subset to generate elements having a fitness value within the first threshold range. The elements generated by performing the genetic operation on the second subset are no longer the original elements in the initial set of color temperature relationship, and these new elements are used as elements in the third subset.

In practical applications, the genetic operation may be performed on the second subset by recombining various correspondence relationships in the second subset by, for example, selecting optimal elements to be retained using a proportional roulette method. Specifically, this may be implemented by firstly recording and retaining elements having better fitness values, when a number of elements in the subset meets the requirements, replacing elements having poor fitness values with the elements having better fitness values, i.e., replacing old elements with new elements, and finally generating the third subset in which each element has a fitness value within the first threshold range.

In the embodiment of the present disclosure, the second subset is optimized by performing a genetic operation on the second subset to obtain the third subset in which each element has a fitness value within the first threshold range. The genetic operation is based on a genetic algorithm. Specifically, according to the evolution rule of "the survival of the fittest, and superior bad discard" of biogenetics, an element is regarded as an individual, an individual having a highest fitness value is firstly recorded according to deterministic sampling selection, and so on, until a number of individuals is reached, and individuals having bad fitness values are replaced with individuals having better fitness values. The optimization method using the genetic algorithm is simple and easy to implement. For example, the fitness value of each element is calculated, and then preferred fitness values are selected in a conventional operation manner in the genetic algorithm, which solves the problem in the related art that when color temperature is adjusted, it is difficult to define an equation for calculating a color temperature value, and the adjustment manner has a high computation complexity and is difficult to implement.

Further, the operation manner in the genetic operation comprises, for example, a selection operation, an interlace operation, and a mutation operation. Therefore, in S122 of the embodiment of the present disclosure, an implementation of performing a genetic operation on the second subset, and selecting elements having a fitness value within the first threshold range from the elements generated by performing the genetic operation as a third subset may comprise: performing at least one of the selection operation, the interlace operation, and the mutation operation on the elements in the second subset, until the third subset is generated. In the embodiment of the present disclosure, the elements having a fitness value within the first threshold range may be obtained through multiple iterations.

In the operation manner of the genetic algorithm, there are a selection operator, an interlace operator and a mutation operator. When the above selection operation, interlace operation and mutation operation are performed, a corresponding operator may be applied to a group (i.e., the initial set of color temperature relationship in the embodiment of the present disclosure) for calculation. Here, the selection operation aims to inherit superior individuals (i.e., elements) to a next generation, and may directly select and then copy the superior individuals and add them to a new group. With respect to the interlace operation, a new individual (an element in the second subset) is formed according to a parent individual (an element in the second subset) by randomly exchanging an anterior portion and a posterior portion of a gene with a certain probability by, for example, using a single-point interlace operation, wherein in the biogenetics, the gene is a unit constituting a chromosome, and in the embodiment of the present disclosure, a combination of a condition level value and a color temperature value may be defined as a gene, i.e., an element. With respect to the mutation operation, a nature of a certain individual is randomly mutated with a small probability by performing, for example, gene-based single-point mutation. After the interlace operation and the mutation operation are performed, the newly formed elements having a fitness value within the first threshold range are added to the third subset.

It should be understood that, as all the elements in the second subset are not within the first threshold range, it can be known that when at least one of the selection operation, the interlace operation and the mutation operation is performed on the elements in the second subset, elements which are selected during the selection operation, each having a higher fitness value, are actually not within the first threshold range. As a result, these elements are only used as intermediate variables in the optimization process, and other genetic operations such as the interlace operation and the mutation operation may further be performed on these elements. For elements on which the selection operation is not performed, the interlace operation and the mutation operation may also be performed on these elements. That is, S122 in the embodiment shown in FIG. 2 may comprise the following steps.

In step 1, elements having a fitness value within a second threshold range are selected from the second subset, and the interlace operation or the mutation operation are performed on the selected elements and unselected elements respectively.

In a practical application of performing the genetic operation, it is usually not enough to perform only a round of selection operation, interlace operation, and mutation operation to obtain elements which meets the requirements, and instead, it is usually required to perform multiple iterations. In the embodiments of the present disclosure, after the above steps are performed, an intermediate state set may be generated. After the above genetic operation is performed, some of elements in the intermediate state set may each have a fitness value within the first threshold range, and these elements are used as the elements in the third subset, and some of the elements in the intermediate state set each have a fitness value not within the first threshold range, and these elements are used as elements in a fourth subset. Then, the genetic operation continues to be performed on the fourth subset in the same manner as that for the second subset. That is, S122 in the embodiment shown in FIG. 2 may further comprise the following steps.

In step 2, the elements which are generated in step 1, each having a fitness value within the first threshold range, are added to the third subset, and the elements which are generated in step 1, each having a fitness value not within the first threshold range, are added to the fourth subset.

In step 3, at least one of the selection operation, the interlace operation, and the mutation operation is performed on the fourth subset according to a fitness value of each element in the fourth subset until fitness values of the elements generated according to the operation are all in within the first threshold range.

Figure 3:
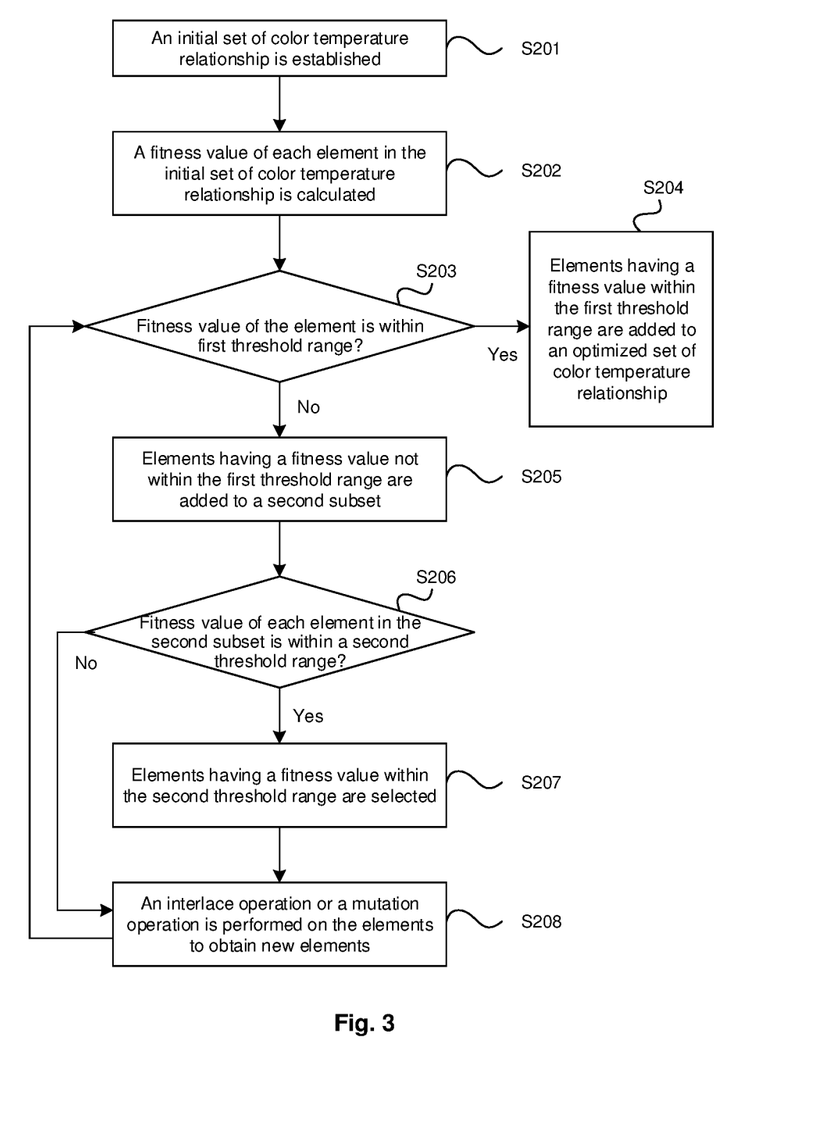
FIG. 3 is a flowchart of yet another method for adjusting color temperature according to an embodiment of the present disclosure.

The implementation of the method for adjusting color temperature according to the embodiment of the present disclosure will be described in detail below. As shown in FIG. 3, illustrated is a flowchart of yet another method for adjusting color temperature according to an embodiment of the present disclosure. The method according to the embodiment of the present disclosure comprises the following steps.

In S201, an initial set of color temperature relationship is established, wherein each element in the set comprises a condition level value and a color temperature value. For example, N groups of condition level values and color temperature values may be randomly established, where N is 150 or another value.

In S202, a fitness value of each element in the initial set of color temperature relationship is calculated as a fitness value component of the element. The fitness value may be defined as: at current color temperature, a high fitness level when an eye blinking frequency is within a predetermined threshold range, an intermediate fitness level when the eye blinking frequency exceeds the predetermined threshold range by 20%, and a low fitness level when the eye blinking frequency exceeds the predetermined threshold range by 50%.

In S203, it is judged whether the fitness value of the element is within the first threshold range, and if so, S204 is performed; otherwise, S205 is performed.

In S204, elements having a fitness value within the first threshold range are added to an optimized set of color temperature relationship.

In S205, elements having a fitness value not within the first threshold range are added to a second subset.

In S206, it is judged whether a fitness value of each element in the second subset is within a second threshold range, and if so, S207 is performed; otherwise, S208 is performed.

In S207, elements having a fitness value within the second threshold range are selected; and then S208 may be performed.

In S208, an interlace operation or a mutation operation is performed on the elements to obtain new elements.

In the present embodiment, after S208, S203 may continue to be performed, i.e., judging whether fitness values of the new elements are within the first threshold range. This process may be performed through multiple iterations, and may end until the fitness values of all the elements are within the first threshold range. At this time, an optimized set of color temperature is obtained.

Based on the method for adjusting color temperature according to the above various embodiments of the present disclosure, the embodiments of the present disclosure further provide an apparatus for adjusting color temperature, which is used to perform the method for adjusting color temperature according to any of the above embodiments of the present disclosure.

Figure 4:
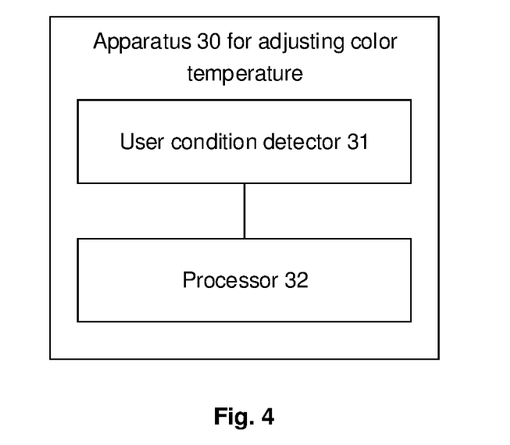
FIG. 4 is a schematic structural diagram of an apparatus for adjusting color temperature according to an embodiment of the present disclosure.

As shown in FIG. 4, illustrated is a schematic structural diagram of an apparatus for adjusting color temperature according to an embodiment of the present disclosure. The apparatus 30 for adjusting color temperature according to the present embodiment comprises a user condition detector 31 and a processor 32.

The user condition detector 31 is configured to detect a condition level value of a user.

The processor 32 is configured to perform operations of establishing an initial set of color temperature relationship, wherein an element in the initial set of color temperature relationship at least comprises three components including a condition level value of a user, a color temperature value of the display device, and a fitness value of the user; determining an optimized set of color temperature relationship from the initial set of color temperature relationship, wherein a fitness value component of each element in the optimized set of color temperature relationship is within a first threshold range; determining, from the optimized set of color temperature relationship, an element corresponding to the condition level value of the current user according to the condition level value of the current user detected by the user condition detector; and adjusting the color temperature of the display device according to a color temperature value of the determined element.

The user condition detector 31 performs the method for adjusting color temperature according to the above embodiment of the present disclosure together with the processor 32, and therefore, the description and the limitations made above in connection with FIGS. 1-3 are equally applicable here.

Specifically, in a case that the element in the initial set of color temperature relationship further comprises at least one additional component indicating at least one classification index of the user, the processor 32 is further configured to: obtain a value of at least one classification index of the current user; and determine, according to the obtained value of the at least one classification index of the current user and the detected condition level value of the current user, the element corresponding to the condition level value of the current user from the optimized set of color temperature relationship.

In an embodiment, the processor 32 is further configured to: select elements having a fitness value within the first threshold range from the initial set of color temperature relationship as a first subset, and select elements having a fitness value not within the first threshold range from the initial set of color temperature relationship as a second subset; perform a genetic operation on the second subset, and select elements having a fitness value within the first threshold range from the elements generated by performing the genetic operation as a third subset; and add the first subset and the third subset to the optimized set of color temperature relationship.

In an embodiment, the processor 32 is further configured to: perform at least one of a selection operation, an interlace operation, and a mutation operation on the elements in the second subset.

In an embodiment, the processor 32 is further configured to: select elements having a fitness value within a second threshold range from the second subset, and perform the interlace operation or the mutation operation on the selected elements and unselected elements respectively.

In an embodiment, the processor 32 is further configured to: add, to the third subset, elements having a fitness value within the first threshold range among elements generated by performing the interlace operation or the mutation operation on the selected elements and the unselected elements respectively, and add, to a fourth subset, elements having a fitness value not within the first threshold range among the elements generated by performing the interlace operation or the mutation operation on the selected elements and the unselected elements respectively; and perform at least one of the selection operation, the interlace operation, and the mutation operation on the fourth subset according to a fitness value of each element in the fourth subset until fitness values of resulted elements are all in within the first threshold range.

Figure 5:
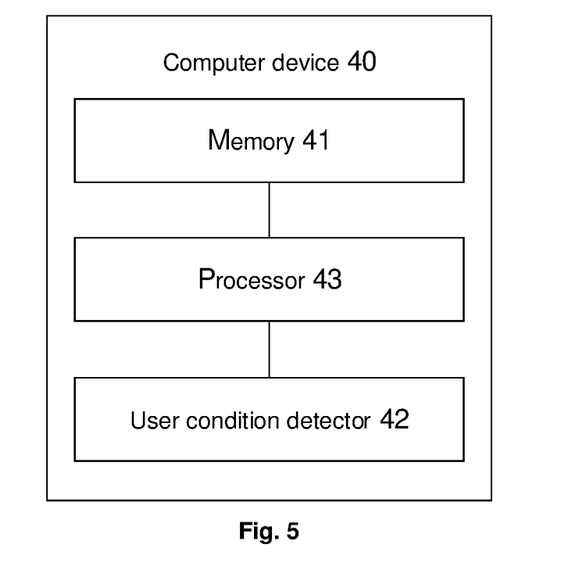
FIG. 5 is a schematic structural diagram of a computer device according to an embodiment of the present disclosure.

FIG. 5 is a schematic structural diagram of a computer device according to an embodiment of the present disclosure. The computer device 40 according to the embodiment of the present disclosure may comprise a memory 41, a user condition detector 42, and a processor 43.

Here, the memory 41 is configured to store instructions executable by the processor 43, which, when executed by the processor 43, enable the computer device 40 to perform the method for adjusting color temperature according to any of the above embodiments.

The embodiments of the present disclosure further provide a computer readable storage medium storing instructions which, when executed by a computer, implement the method for adjusting color temperature according to any of the above embodiments of the present disclosure.

Although the embodiments disclosed in the present disclosure are as described above, the content is merely implementations used to facilitate a understanding of the present disclosure, and is not intended to limit the present disclosure. Any modification and variation in the form and details of the implementation can be made by those skilled in the art to which the present disclosure belongs without departing from the spirit and scope of the present disclosure. The patent protection scope of the present disclosure should still be defined by the scope of the appended claims.

The invention claimed is:

1. A method for adjusting color temperature of a display device, the method comprising:
    establishing an initial set of color temperature relationship, wherein an element in the initial set of color temperature relationship at least comprises three components including a condition level value of a user indicating physical condition of the user, a color temperature value of the display device, and a fitness value of the user indicating fitness of the user to the color temperature value of the display device at the condition level value of the user;
    determining an optimized set of color temperature relationship from the initial set of color temperature relationship, wherein a fitness value component of each element in the optimized set of color temperature relationship is within a first threshold range;
    detecting a condition level value of a current user;
    determining, from the optimized set of color temperature relationship, an element corresponding to the condition level value of the current user according to the detected condition level value of the current user; and
    adjusting the color temperature of the display device according to a color temperature value of the determined element,
    wherein determining an optimized set of color temperature relationship from the initial set of color temperature relationship comprises:
    selecting elements having a fitness value within the first threshold range from the initial set of color temperature relationship as a first subset, and selecting elements having a fitness value not within the first threshold range from the initial set of color temperature relationship as a second subset;
    performing a genetic operation on the second subset, and selecting elements having a fitness value within the first threshold range from the elements generated by performing the genetic operation as a third subset; and
    adding the first subset and the third subset to the optimized set of color temperature relationship.

2. The method according to claim 1, wherein the element in the initial set of color temperature relationship further comprises at least one additional component indicating at least one classification index of the user, wherein determining, from the optimized set of color temperature relationship, an element corresponding to the condition level value of the current user according to the detected condition level value of the current user comprises:
    obtaining a value of at least one classification index of the current user; and
    determining, according to the obtained value of the at least one classification index of the current user and the detected condition level value of the current user, the element corresponding to the condition level value of the current user from the optimized set of color temperature relationship.

3. The method according to claim 1, wherein performing a genetic operation on the second subset, and selecting elements having a fitness value within the first threshold range from the elements generated by performing the genetic operation as a third subset comprises:
    performing at least one of a selection operation, an interlace operation, and a mutation operation on the elements in the second subset.

4. The method according to claim 3, wherein performing at least one of a selection operation, an interlace operation, and a mutation operation on the elements in the second subset comprises:
    selecting elements having a fitness value within a second threshold range from the second subset, and performing the interlace operation or the mutation operation on the selected elements and unselected elements respectively.

5. The method according to claim 4, wherein performing at least one of a selection operation, an interlace operation, and a mutation operation on the elements in the second subset further comprises:
    adding, to the third subset, elements having a fitness value within the first threshold range among elements generated by performing the interlace operation or the mutation operation on the selected elements and the unselected elements respectively, and adding, to a fourth subset, elements having a fitness value not within the first threshold range among the elements generated by performing the interlace operation or the mutation operation on the selected elements and the unselected elements respectively; and
    performing at least one of the selection operation, the interlace operation, and the mutation operation on the fourth subset according to a fitness value of each element in the fourth subset until fitness values of resulted elements are all in within the first threshold range.

6. The method according to claim 1, wherein
the condition level value indicates a condition of a body of the user or a part of the body of the user, and the fitness value indicates a degree of fitness of the user having a corresponding condition level at a corresponding color temperature value.

7. An apparatus for adjusting color temperature of a display device, the apparatus comprising:
- a user condition detector configured to detect a condition level value of a user; and
- a processor configured to perform operations of:
  - establishing an initial set of color temperature relationship, wherein an element in the initial set of color temperature relationship at least comprises three components including a condition level value of a user, a color temperature value of the display device, and a fitness value of the user;
  - determining an optimized set of color temperature relationship from the initial set of color temperature relationship, wherein a fitness value component of each element in the optimized set of color temperature relationship is within a first threshold range;
  - determining, from the optimized set of color temperature relationship, an element corresponding to the condition level value of the current user according to the condition level value of the current user detected by the user condition detector;
  - adjusting the color temperature of the display device according to a color temperature value of the determined element;
  - selecting elements having a fitness value within the first threshold range from the initial set of color temperature relationship as a first subset, and selecting elements having a fitness value not within the first threshold range from the initial set of color temperature relationship as a second subset;
  - performing a genetic operation on the second subset, and select elements having a fitness value within the first threshold range from the elements generated by performing the genetic operation as a third subset; and
  - adding the first subset and the third subset to the optimized set of color temperature relationship.

8. The apparatus according to claim 7, wherein the element in the initial set of color temperature relationship further comprises at least one additional component indicating at least one classification index of the user, and the processor is further configured to:
- obtain a value of at least one classification index of the current user; and
- determine, according to the obtained value of the at least one classification index of the current user and the detected condition level value of the current user, the element corresponding to the condition level value of the current user from the optimized set of color temperature relationship.

9. The apparatus according to claim 7, wherein the processor is further configured to:
- perform at least one of a selection operation, an interlace operation, and a mutation operation on the elements in the second subset.

10. The apparatus according to claim 9, wherein the processor is further configured to:
select elements having a fitness value within a second threshold range from the second subset, and perform the interlace operation or the mutation operation on the selected elements and unselected elements respectively.

11. The apparatus according to claim 10, wherein the processor is further configured to:
- add, to the third subset, elements having a fitness value within the first threshold range among elements generated by performing the interlace operation or the mutation operation on the selected elements and the unselected elements respectively, and add, to a fourth subset, elements having a fitness value not within the first threshold range among the elements generated by performing the interlace operation or the mutation operation on the selected elements and the unselected elements respectively; and
- perform at least one of the selection operation, the interlace operation, and the mutation operation on the fourth subset according to a fitness value of each element in the fourth subset until fitness values of resulted elements are all in within the first threshold range.

12. The apparatus according to claim 7, wherein
the condition level value indicates a condition of a body of the user or a part of the body of the user, and
the fitness value indicates a degree of fitness of the user having a corresponding condition level at a corresponding color temperature value.

13. A computer device comprising a memory, a user condition detector and a processor, wherein the memory is configured to store instructions executable by the processor, which, when executed by the processor, enable the computer device to perform the method for adjusting color temperature according to claim 1.

14. A computer device comprising a memory, a user condition detector and a processor, wherein the memory is configured to store instructions executable by the processor, which, when executed by the processor, enable the computer device to perform the method for adjusting color temperature according to claim 2.

15. A computer device comprising a memory, a user condition detector and a processor, wherein the memory is configured to store instructions executable by the processor, which, when executed by the processor, enable the computer device to perform the method for adjusting color temperature according to claim 3.

16. A non-transitory computer readable storage medium storing instructions which, when executed by a computer, implement the method for adjusting color temperature according to claim 1.

17. A non-transitory computer readable storage medium storing instructions which, when executed by a computer, implement the method for adjusting color temperature according to claim 2.

18. A non-transitory computer readable storage medium storing instructions which, when executed by a computer, implement the method for adjusting color temperature according to claim 3.

* * * * *